United States Patent [19]

Ferrari et al.

[11] Patent Number: 4,652,425
[45] Date of Patent: Mar. 24, 1987

[54] BOTTOM GRID MOUNTED DEBRIS TRAP FOR A FUEL ASSEMBLY

[75] Inventors: Harry M. Ferrari, Edgewood Boro; John F. Wilson, Murrysville, both of Pa.

[73] Assignee: Westinghouse Electric Corp., Pittsburgh, Pa.

[21] Appl. No.: 763,737

[22] Filed: Aug. 8, 1985

[51] Int. Cl.4 ............................................... G21C 3/30
[52] U.S. Cl. ..................... 376/352; 376/313; 376/443; 376/446
[58] Field of Search ............... 376/352, 439, 440, 443, 376/446, 313; 210/305, 308, 232

[56] References Cited

U.S. PATENT DOCUMENTS

| Re. 27,950 | 3/1974 | Frisch | 376/446 |
|---|---|---|---|
| 3,228,854 | 1/1966 | Bekkering et al. | 376/442 |
| 3,733,252 | 5/1973 | Georges et al. | 376/442 |
| 3,852,154 | 12/1974 | Carlson et al. | 376/442 |
| 4,072,614 | 2/1978 | Harris | 210/305 |
| 4,096,032 | 6/1978 | Mayers et al. | |
| 4,297,171 | 10/1981 | Olsson | 376/440 |
| 4,427,624 | 1/1984 | Marlatt et al. | |

FOREIGN PATENT DOCUMENTS

| 0118355 | 9/1984 | European Pat. Off. | 376/440 |
|---|---|---|---|
| 0102493 | 8/1979 | Japan | 376/352 |
| 1184980 | 3/1970 | United Kingdom | 376/446 |
| 1214998 | 12/1970 | United Kingdom | |
| 2022909 | 12/1979 | United Kingdom | 376/442 |

Primary Examiner—Harvey E. Behrend

[57] ABSTRACT

A trap for catching debris carried by coolant flowing from the bottom nozzle of a fuel assembly to the bottom or lowermost one of the grids of the assembly which support the fuel rods in an organized array therein includes a structure disposed between the bottom nozzle and the bottom grid and generally aligned with the lower end plugs of the fuel rods. The structure forms a multiplicity of hollow cells each being open at opposite ends and defining a central cavity which receives one of the fuel rod lower end plugs while providing for passage of coolant flow therethrough from the bottom nozzle to the bottom grid. Also, the trap includes means in the form of dimples defined in each of the cells for catching debris carried into the cells by the coolant flowing therethrough. The dimples are formed from the wall portions defining the cells and extend into the cavities of the cells. Each dimple has a configuration generally arched outwardly from the wall portion which is oriented in alignment with the direction of coolant flow through the cell. The distance between those dimples formed on oppositely-disposed ones of the wall portions is slightly greater than the diameter of the fuel rod lower end plug disposed in the cavity of each cell. Additionally, the debris trap further includes structure support means in the form of a plurality of hanger straps attached at their lower ends to the structure adjacent the corners thereof and at their upper ends to the bottom grid so as to locate the structure in the spaced relationship below the bottom grid and support the structure adjacent the corners thereof from the bottom grid.

12 Claims, 5 Drawing Figures

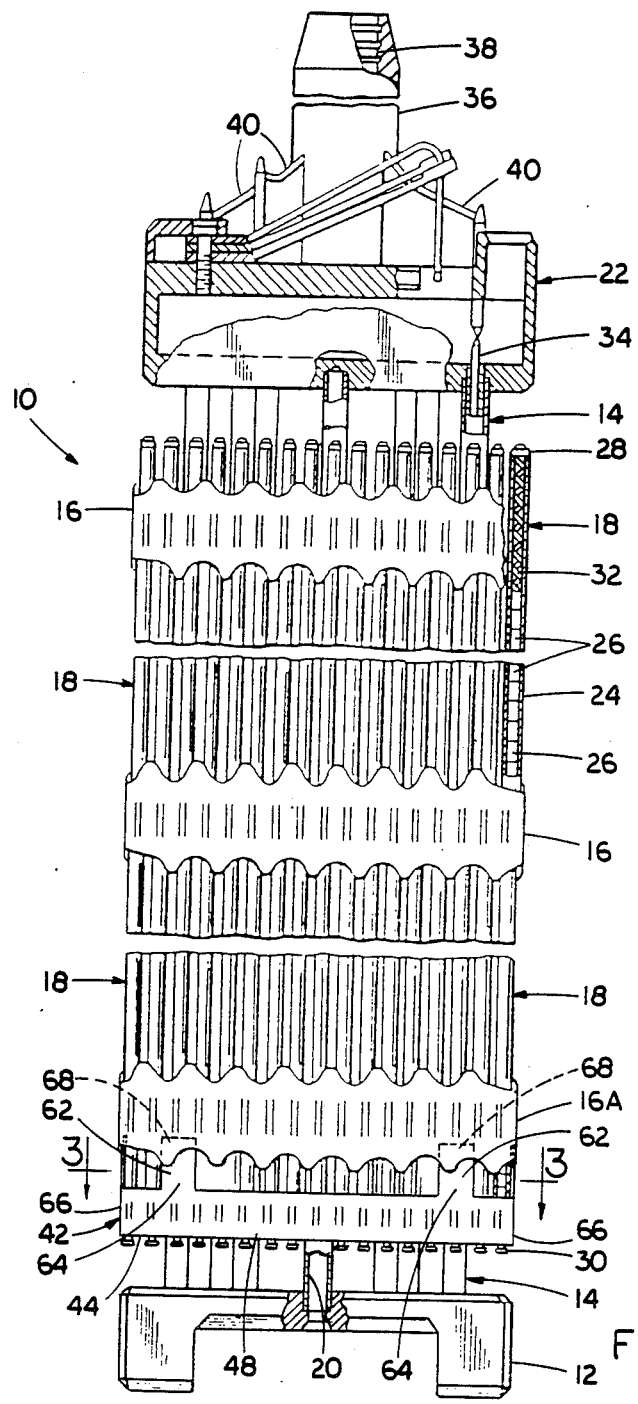
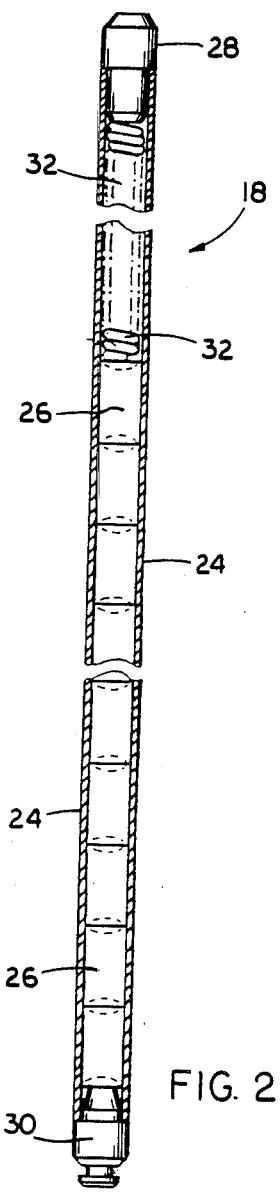
FIG. 1
FIG. 2

BOTTOM GRID MOUNTED DEBRIS TRAP FOR A FUEL ASSEMBLY

CROSS REFERENCE TO RELATED APPLICATIONS

Reference is hereby made to the following copending applications dealing with related subject matter and assigned to the assignee of the present invention:

1. "Debris Trap For A Pressurized Water Nuclear Reactor" by John F. Wilson et al, assigned U.S. Ser. No. 672,040 and filed Nov. 16, 1984. (W.E. 52,222)

2. "Fuel Assembly Bottom Nozzle With Integral Debris Trap" by John F. Wilson et al, assigned U.S. Ser. No. 672,041 and filed Nov. 16, 1984. (W.E. 52,223)

3. "Wire Mesh Debris Trap For A Fuel Assembly" by William Bryan, assigned U.S. Ser. No. 679,511 and filed Dec. 7, 1984. (W.E. 52,287)

4. "Debris-Retaining Trap For A Fuel Assembly" by John A. Rylatt, assigned U.S. Ser. No. 720,109 and filed Apr. 4, 1985. (W.E. 52,484)

5. "Nuclear Fuel Rod Support Grid With Improved Multiple Dimple Arrangement" by John A. Rylatt, assigned U.S. Ser. No. 729,387 and filed May 1, 1985. (W.E. 52,505)

BACKGROUND OF THE INVENTION

1. Field of the Invention

The present invention relates generally to nuclear reactors and, more particularly, is concerned with a trap mounted below the bottom grid and above the bottom nozzle of a fuel assembly and adjacent the lower end plugs of the fuel rods supported in the fuel assembly for trapping debris left in the reactor after assembly, repair and/or replacement operations so as to prevent entry and lodging thereof in the fuel assembly bottom grid where the debris can cause cladding perforations in the fuel rods and other damage to the fuel assembly.

2. Description of the Prior Art

During manufacture and subsequent installation and repair of components comprising a nuclear reactor coolant circulation system, diligent effort is made to held assure removal of all debris from the reactor vessel and its associated systems which circulate coolant therethrough under various operating conditions. Although elaborate procedures are carried out to help assure debris removal, experience shows that in spite of the safeguards used to effect such removal, some chips and metal particles still remain hidden in the system.

In particular, fuel assembly damage due to debris trapped at the bottom grid has been noted in several reactors in recent years. The damage consists of fuel rod tube perforations caused by fretting of debris in contact with the exterior of the tube. The debris tends to be relatively thin rectangular pieces, as opposed to pieces which are spherical in shape. Specifically, most of the debris consists of metal turnings which were probably left in the primary system after steam generator repair or replacement. The debris lodges in the region of the lower most grid within the spaces between its "egg-crate" shaped cell walls and the lower end portion of the fuel rod tubes. Amost all of the debris is deposited in the bottom grid just above the four coolant flow openings in the lower core support plate.

One approach has been to provide longer end plugs on the lower ends of the fuel rods which extend upwardly through the bottom part of the lowermost grid so that any fretting would occur against the solid end plug and not the cladding of the fuel rod tube. Although effective in reducing fuel rod cladding perforation, this concept has the disadvantage that the fuel stack height is shortened by up to several inches which has adverse effects on margins and on achieving longer burnups.

Several other different approaches have been proposed and tried for carrying out removal of debris from nuclear reactors. Many of these approaches, involving the use of screens at various places in the reactor core, of basins for catching the debris or of removable filters during preoperational testing, are discussed in U.S. Pat. No. 4,096,032 to Mayers et al.

While all of the approaches referred to above operate reasonably well and generally achieve their objectives under the range of operating conditions for which they were designed, they also create several other problems. Consequently, a need still exists for a fresh approach to the problem of debris capture in nuclear reactors. The new approach must be compatible with the existing structure and operation of the components of the reactor, be effective throughout the operating cycle of the reactor, and at least provides overall benefits which outweigh the costs it adds to the reactor.

SUMMARY OF THE INVENTION

The present invention provides a debris-catching trap designed to satisfy the aforementioned needs. As an alternative to the common approach of the first four patent applications cross-referenced above, wherein a debris trap is associated in some manner with the bottom nozzle of the fuel assembly, the approach of the present invention is to provide the debris trap above the bottom nozzle and below the lowermost one of the plurality of grids axially spaced along the fuel assembly length. While the common approach of the four cross-reference applications is expected to be effective, some of the embodiments resulting from such approach are relatively expensive and others tend to increase the overall fuel assembly pressure drop which can result in a loss in critical heat flux margin and increased requirements on fuel assembly hold-down springs. In the alternative approach herein, the debris is trapped at the level of the solid lower end plugs of the fuel rods instead of at the level of the fuel rod cladding. Thus, any vibration induced fretting wear occurs on the end plugs and any failures caused by debris impinging the cladding just below the bottom grid will be eliminated. The wear on the end plugs would be harmless since even the maximum amount of wear conceivably caused by this fretting would not result in failure or in any other problems. This approach has a high probability of being an effective solution because it simulates the normal bottom grid geometry which has been shown to be effective in trapping debris.

Accordingly, the present invention sets forth in a fuel assembly for a nuclear reactor including a plurality of nuclear fuel rods, each fuel rod having a cladding tube and a lower end plug attached to the tube, at least a bottom grid supporting the fuel rods in an organized array and disposed in spaced relationship above the lower end plugs of the fuel rods, a bottom nozzle disposed in spaced relationship below the bottom grid and disposed below the lower end plugs of the fuel rods and coolant flowing upwardly through the bottom nozzle and to the bottom grid, a trap for catching debris carried by the flowing coolant to substantially prevent the same from reaching the bottom grid. The debris trap comprises: (a) a structure disposed between the bottom nozzle and the bottom grid and generally aligned with the lower end plugs of the fuel rods, the structure forming a multiplicity of hollow cells each being open at opposite ends and defining a central cavity which receives one of the fuel rod lower end plugs while providing for passage of coolant flow therethrough from the bottom nozzle to the bottom grid; and (b) means defined in each of the cells for catching debris carried into the cells by the coolant flowing therethrough.

More particularly, the trap structure includes interconnected wall portions forming each of the cells and defining the central cavity thereof. Also, the catching means in each cell is in the form of at least one member attached to one wall portion and extending into the cavity of the cell. The member is a projection fabricated from the wall portion so as to extend into the cell cavity.

Still further, the trap catching means includes dimples formed on the wall portions so as to extend outwardly into the respective cells. Each dimple has a configuration generally arched outwardly from the wall portion which is oriented in alignment with the direction of coolant flow through the cell. The distance between those dimples formed on oppositely-disposed ones of the wall portions is slightly greater than the diameter of the fuel rod lower end plug disposed in the cavity of each cell.

Additionally, the debris trap further comprises means attached to the trap structure and the bottom grid so as to support the structure from the grid. The trap structure support means extends between the structure and the bottom grid so as to locate the structure in spaced relationship below the bottom grid. More particularly, the structure of the trap is composed of a plurality of outer straps interconnected at their opposite ends so as to define a perimeter of the structure and a plurality of corners on the structure. Further, the structure support means includes a plurality of hanger straps attached at their lower ends to the outer straps adjacent the corners of the structure and extending upwardly therefrom. The hanger straps are also attached at their upper ends to the bottom grid so as to locate the structure in spaced relationship below the bottom grid and support the structure adjacent the corners thereof from the bottom grid.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is an elevational view, partly in section, of a fuel assembly in which is incorporated the preferred embodiment of the debris trap of the present invention, the assembly being illustrated in vertically foreshortened form with parts broken away for clarity.

FIG. 2 is an enlarged elevational view, partly in section, of one of the nuclear fuel rods of the fuel assembly of FIG. 1, the fuel rod being shown in vertically foreshortened form and removed from the assembly in order to expose its lower end plug with which is aligned the debris trap of the present invention.

DETAILED DESCRIPTION OF THE INVENTION

Figure 3:
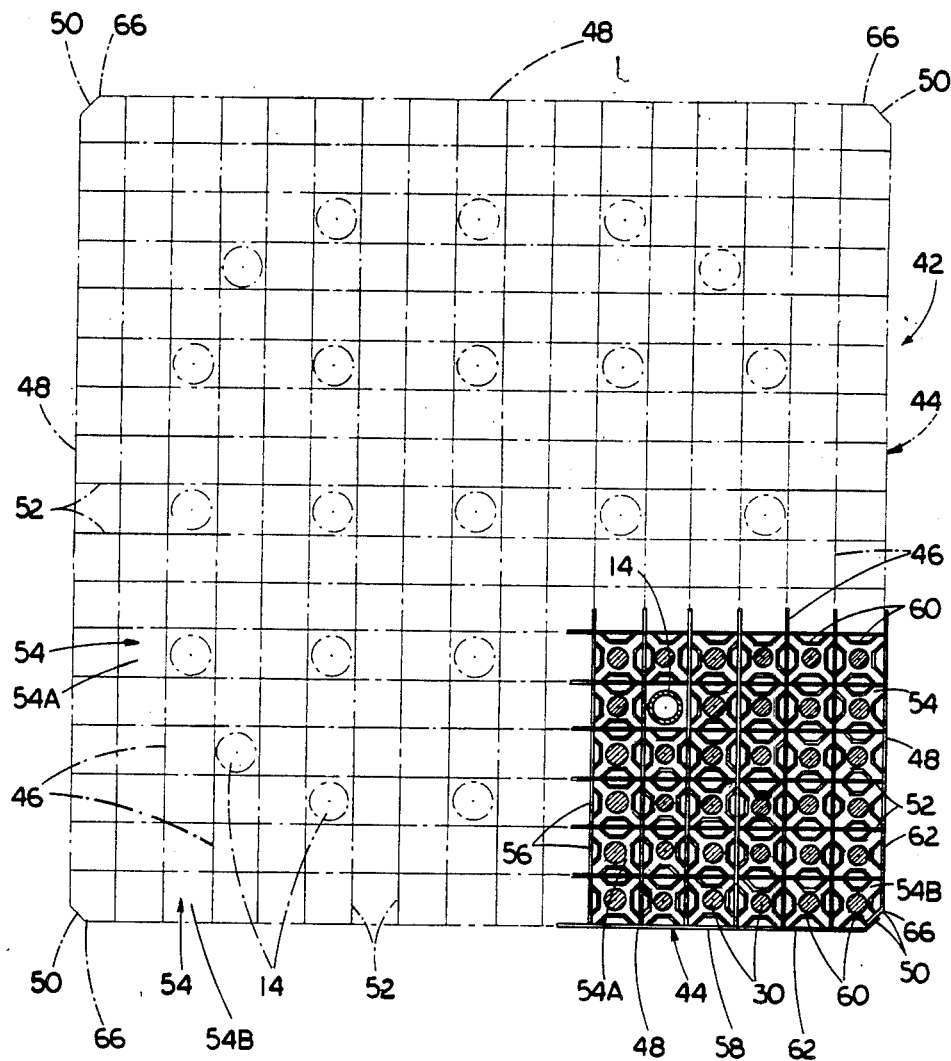
FIG. 3 is an enlarged top plan view, partly in section, of the debris trap of the present invention, as seen along line 3—3 of FIG. 1.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangment of parts, the fuel assembly 10 forms an integral unit capable of being conventionally handles without damaging the assembly parts.

As mentioned above, the fuel rods 18 in the array thereof in the assembly 10 are held in spaced relationship with one another by the grids 16 spaced along the fuel assembly length. Also referring to FIG. 2, each fuel rod 18 includes an elongated hollow cladding tube 24 containing a stack of nuclear fuel pellets 26 therein and having its opposite ends closed by upper and lower end plugs 28,30, typically being welded to the tube, to provide a hermetically sealed rod. Commonly, a plenum spring 32 is disposed between the upper end plug 28 and the top one of the pellets 26 in the stack thereof to maintain the pellets in a tight, stacked relationship within the rod 18. The fuel pellets 26 composed of fissile material are responsible for creating the reactive power of the reactor. A liquid moderator/coolant such as water, or water containing boron, is pumped outwardly through the guide thimbles 14 and along the fuel rods 18 of the fuel assembly 10 in order to extract heat generated therein for the production of useful work.

To control the fission process, a number of control rods 34 are reciprocally movable in the guide thimbles 14 located at predetermined positions in the fuel assembly 10. Specifically, the top nozzle 22 has operatively associated therewith a rod cluster control mechanism 36 having an internally threaded cylindrical member 38 with a plurality of radially extending flukes or arms 40.

Each arm 40 is interconnected to a control rod 34 such that the control mechanism 36 is operable to move the control rods 34 vertically in the guide thimbles 14 to thereby control the fission process in the fuel assembly 10, all in a well-known manner.

Debris Trap Mounted Between Botttom Grid and Nozzle

As mentioned above, fuel assembly damage due to debris trapped at the bottom or lowermost one of the grids 16A has been noticed in recent years. As seen in FIG. 1, the bottom grid 16A is disposed in spaced relationship above the lower end plugs 30 of the fuel rods 18, while the bottom nozzle 12 is disposed in spaced relationship below the bottom grid 16A and below the fuel rod lower end plugs 30. In absence of the present invention, coolant carrying debris flows directly upwardly through the bottom nozzle 12 past the lower end plugs 30 of the fuel rods 18 and to the bottom grid 16A positioned about the lower portions of the fuel rod cladding tubes 24. The bottom grid 16A has a conventional construction (not shown) composed of a multiplicity of interleaved straps defining a matrix of hollow cells, a majority of which accept the tube 24 of one fuel rod 18 and a minority of which accept one guide thimble 14. The cells which receive the fuel rods 18 have sets of springs and dimples for contacting and holding the fuel rod tubes 24. These features also catch debris reaching the bottom grid 16A which in turn over time causes fretting wear and perforation of the fuel rod tubes. Therefore, to prevent occurrence of such damage, it is highly desirable to catch this debris before it reaches the bottom grid 16A.

The basic concept underlying the present invention is to, in effect, extend the bottom grid 16A by providing a separate short grid-like extension so that the debris will get trapped between the grid-like extension and the lower end plugs 30 of the fuel rods 18. It should be noted that the bottom grid 16A cannot simply be lowered because it would then lose contact with the fuel rods 18 if the fuel rods were to lift early in life when maximum clearance exists between the upper end plugs 28 of the fuel rods 18 and the top nozzle 22.

Therefore, the present invention is directed to a debris trap, generally indicated by the numeral 42, being supported from the bottom grid 16A and located between it and the bottom nozzle 12 at the level of the lower end plugs 30 of the fuel rods 18, as illustrated in FIG. 1. The trap 42 is positioned around and between the fuel rod lower end plugs 30 and across the path of coolant flow from the bottom nozzle 12 to the fuel rods 18 of the fuel assembly 10 so as to catch debris, such as small loose parts or pieces, from the flowing coolant and thereby substantially prevent it from reaching the bottom grid 16A of the assembly.

As seen in FIGS. 1 and 3 to 5, the debris trap 42 includes a fuel rod nonsupport structure 44 being disposed between the bottom nozzle 12 and the bottom grid 16A and generally aligned with the lower end plugs 30 of the fuel rods 18. The structure 44 is composed of a plurality of inner straps 46 aligned with respect to each other in a cross-laced or crisscross interlocking arrangement and a plurality of outer straps 48 interconnected at their opposite ends 50 and with opposite ends 52 of the inner straps 46 so as to define the perimeter of the structure 44. The inner and outer straps 46,48 together define a multiplicity of hollow cells 54, each cell being open at opposite ends and defining a central cavity. A majority of the cells 54 each receives one of the fuel rod lower end plugs 30 in nonsupporting relationship, while a minority of cells 54 each receives one guide thimble 14. Also, the cell cavity provides for passage of coolant flow therethrough from the bottom nozzle 12 to the bottom grid 16A.

More particularly, the inner straps 46 define interior wall portions 56 in oppositely-disposed interconnected pairs so as to form each of a plurality of inner ones 54A of the cells 54. Similarly, the outer straps 48 define exterior wall portions 58 which together with selected ones of the interior wall portions 56 of the inner straps 46 form a plurality of outer perimeter ones 54B of the cells 54.

Figure 4:
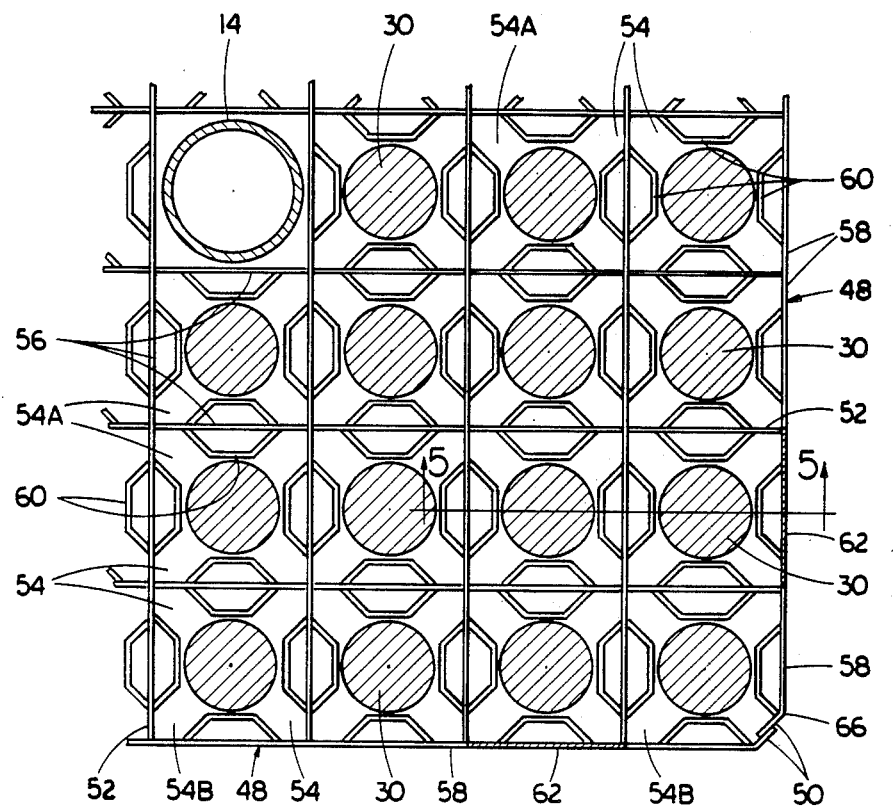
FIG. 4 is an enlarged fragmentary top plan view of the lower right corner of the trap of FIG. 3.
Figure 5:
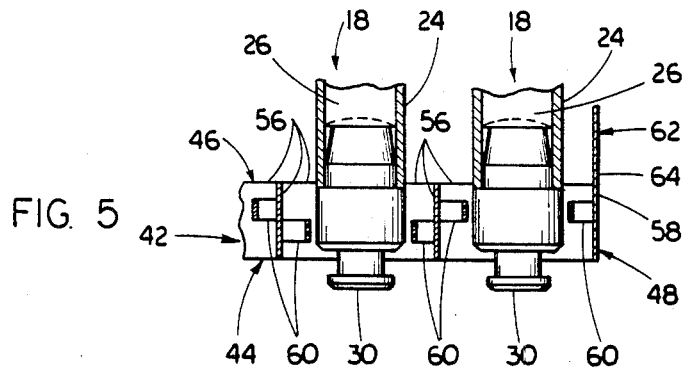
FIG. 5 is an enlarged sectional view, as taken along line 5—5 of FIG. 4, showing the construction of the trap and the positions of its parts relative to the lower end plugs of the fuel rods of the fuel assembly.

Also, the debris step 42 includes means defined in each of the hollow cells 54 for catching debris carried into the cavities of the cells by coolant flowing therethrough past the fuel rod lower end plugs 30. The catching means are a plurality of projections, preferably, in the form of dimples 60 defined in each of the cells 54. The dimples 60 are formed by an suitable method, such as die punching, from the wall portions 56,58 defining the cells 54A,54B and extend into the cavities of the cells. The pair of dimples 60 formed on each interior wall portion 56 (with the exception of the ones which define the cell receiving a guide thimble 14, as seen in FIG. 4) extend outwardly in opposite directions therefrom into respective adjacent cells 54 sharing the interior wall portion 56. The dimple 60 formed on each exterior wall portion 58 extends into the respective perimeter cell 54B. Each dimple 60 has a configuration generally arched outwardly from the wall portion 56,58 which is oriented in alignment with the direction of coolant flow through the cell 54. As clearly seen in FIGS. 3 to 5, the distance between those dimples 60 formed on oppositely-disposed ones of the wall portions 56,58 is slightly greater than the diameter of the fuel rod lower end plug 30 disposed in the cavity of each cell 54 so as to thereby be disposed in a nonsupporting relationship with the end plug.

Finally, the debris trap 42 is preferably supported from bottom grid 16A. The structure support means is in the form of a plurality of hanger straps 62 attached at their lower ends 64 to the trap structure 44 adjacent the corners 66 thereof. The upper ends 68 of the straps 62 are, in turn, connected to the bottom grid 16A so as to locate the structure in spaced relationship below the bottom grid 16A and thereby support the structure 44 adjacent the corners 66 thereof from the bottom grid 16A.

As mentioned previously, although the debris now trapped adjacent and contact with the lower end plugs 30 of the fuel rods 18 still vibrate and cause some fretting wear against the solid end plugs 30, it will be harmless compared to fretting through the thin-walled Zircaloy cladding tubes 24 which occurs without the debris trap 42. The maximum conceivable fretting at the end plugs would not result in failure or any problems.

It is thought that the debris trap of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. In a fuel assembly for a nuclear reactor including a plurality of nuclear fuel rods, each fuel rod in said fuel assembly having a cladding tube and a lower end plug attached to said tube, at least a bottom grid supporting each and everyone of said fuel rods in an organized array and disposed in spaced relationship above said lower end plugs of said fuel rods, a bottom nozzle disposed in spaced relationship below said bottom grid and disposed below said lower end plugs of said fuel rods and coolant flowing upwardly through said bottom nozzle and to said bottom grid, a trap for catching debris carried by said flowing coolant to substantially prevent the same from reaching said bottom grid, said debris trap comprising:

(a) a fuel rod nonsupport structure disposed completely across the entire expanse of said fuel assembly and axially between said bottom nozzle and said bottom grid and generally aligned with said lower end plugs of said fuel rods, said structure forming a multiplicity of hollow cells each being open at opposite ends and defining a central cavity which receives one of said fuel rod lower end plugs in nonsupporting and noncontacting relationship while providing for passage of coolant flow therethrough from said bottom nozzle to said bottom grid, each of said fuel rod lower end plugs extending into a respective hollow cell of said structure.

(b) means defined in each of said cells disposed in nonsupporting and noncontacting relationship with said fuel rod end plug for catching debris carried into said cells by said coolant flowing therethrough; and (c) a plurality of hanger straps attached at their lower ends to said structure and extending upwardly therefrom, said hanger straps being attached at their upper ends to said bottom grid so as to support said structure from and in spaced relationship below said bottom grid.

2. The debris trap as recited in claim 1, wherein:
said structure includes interconnected wall portions forming each of said cells and defining said central cavity thereof; and
said catching means in each said cell is in the form of at least one member attached to one said wall portion and extending into said cavity of said cell.

3. The debris trap as recited in claim 2, wherein said member is a projection fabricated from said wall portion so as to extend into said cavity of said cell.

4. The debris trap as recited in claim 2, wherein said structure is composed of a plurality of inner straps aligned with respect to each other in a crisscross interlocking arrangement and defining interior ones of said wall portions in oppositelydisposed interconnected pairs so as to form each of a plurality of inner ones of said cells.

5. The debris trap as recited in claim 4, wherein said debris catching means includes a pair of dimples formed on each interior wall portion so as to extend outwardly in opposite directions therefrom into respective adjacent cells sharing said wall portion.

6. The debris trap as recited in claim 5, wherein each dimple has a configuration generally arched outwardly from said interior wall portion which is oriented in alignment with the direction of coolant flow through said cell.

7. The debris trap as recited in claim 5, wherein the distance between dimples formed on oppositely-disposed interior wall portions is slightly greater than the diameter of said fuel rod lower end plug disposed in said cavity of said cell.

8. The debris trap as recited in claim 4, wherein said structure further includes a plurality of outer straps interconnected at their opposite ends and with opposite ends of said inner straps so as to define a perimeter of said structure and exterior wall portions of a plurality of outer perimeter ones of said cells formed with interior wall portions of said inner straps.

9. The debris trap as recited in claim 8, wherein said debris catching means includes a dimple formed on each exterior wall portion so as to extend into said respective perimeter cell.

10. The debris trap as recited in claim 9, wherein each dimple has a configuration generally arched outwardly from said exterior wall portion which is oriented in alignment with the direction of coolant flow through said cell.

11. The debris trap as recited in claim 9, wherein the distance between dimples formed on oppositely-disposed interior and exterior wall portions of said perimeter cells is slightly greater than the diameter of said fuel rod lower end plug disposed in said cavity of said cell.

12. The debris trap as recited in claim 8, wherein:
said interconnected outer straps define a plurality of corners on said structure; and
said hanger straps are attached at their lower ends to said outer straps to support said structure adjacent said corners thereof from said bottom grid.

* * * * *